Patented May 20, 1941

2,242,675

UNITED STATES PATENT OFFICE 2,242,675

RECOVERING METAL VALUES FROM FUELS

Hendrik Jan Jakob Janssen, The Hague, Netherlands, assignor to Shell Development Company, San Francisco, Calif., a corporation of Delaware No Drawing. Application March 20, 1939, Serial No. 263,088. In the Netherlands May 14, 1938

5 Claims. (Cl. 23—21)

This invention relates to a process for the recovery of metals, or metal compounds from coals and oils containing metal compounds. It is known that various fuel coals and crude mineral oils contain small quantities of metals generally in the form of organic compounds. There are, for example, crude oils containing small quantities of vanadium, tungsten, nickel and compounds of the same metals. When fuels containing such metals or metal compounds are subjected to combustion in the usual manner in a furnace, the metals or metal compounds are converted to the corresponding metallic oxides and pass on up the flue with the soot and flue gases. This fact is disclosed in U. S. Patent 1,651,967.

It is also known that unless some method is used to entrap the flue-ash and remove the metal compounds, as much as 95% of these metal values will pass on out the flue as combustion dust and be irrecoverably lost. It has also been shown that if the size of the flue ash particles is controlled (as disclosed in U. S. Patent 2,118,351) within the limits of 100–200 microns prior to separation from the flue gas, as much as 90% of the metal values may be recovered.

Many fuel coals and oils, however, contain such small quantities of the various above-mentioned metals and metal compounds that recovery by the known methods is not commercially feasible. As has been previously mentioned, as much as 90% of the metal values contained in the crude may be recovered, but in many cases this involves handling prohibitive quantities of soot to obtain a few pounds of the metal compounds.

Quite surprisingly, it has now been found that the valuable metal or metal compound content increases as the size of the flue ash particles decreases. This discovery forms the basis of the present invention.

It has been observed that if the flue ash particles are separated into finer and coarser portions, the finer portion will contain several times as much of the metal values as the coarser portion. It was therefore decided to reduce the size of the coarser particles and determine whether the metal value content increased. If the process is carried out in a pulverized coal-fired furnace, the flue ash may be first separated into finer and coarser portions, the coarser portions being either returned directly to the combustion space and recycled or first ground in the mill used for the coal and then returned to the combustion space. Contrary to expectations, incrustation with consequent increase of size of the flue ash particles does not occur in the recycling process. It appears that in returning the coarser flue ash to the combustion chamber, further separation of the carbon still contained in it is promoted, so that the relative proportion of the metal values increases.

The separation between finer and coarser flue ash particles need not be a very sharp one, because as a rule the valuable metal content gradually increases as the size of the flue ash particles decreases. In determining where the limit between coarse and fine flue ash is to be taken, the nature of the particular fuel being used must be taken under consideration. To illustrate, different limits might have to be set for crude oil, coal, fuel oil and petroleum coke. As a specific example, it was found that in using Venezuelan or Mexican crudes, the most advantageous limit was between 10 and 40 microns. If the flue ash from such crudes is processed in the known manner, i. e. controlling the flue ash particle size between 100 and 200 microns, the recovered flue ash was found to contain at most 3% vanadium. When treated according to the present invention, i. e. recycling the coarser flue ash until all of the flue ash particles are less than 10–40 microns in diameter, flue ash was recovered with a vanadium content of 22%. In other words, if seven tons of flue ash were processed by existing methods to obtain a given quantity of vanadium values, one ton processed according to the present invention would yield the same quantity of vanadium values.

The actual separation of the flue ash into finer and coarser particles may be effected by separating the flue ash from the flue gas in its entirety and then splitting into two parts as desired, but preferably the coarser and finer flue ash are collected separately from the flue gas directly. The coarser portion is then returned to the combustion chamber and recycled until of the desired size, while the finer portion is collected and set aside for extraction of the metal values.

In order to separate the coarser flue ash, cyclones are generally applied. As the size of the cyclones affects the minimum dimensions of the flue ash separated, it is often advantageous to use several small cyclones rather than one large unit. The coarser flue ash may also be separated by means of other common collectors, for example, with an oil filter or a bed of coke. When utilizing such types, the oil or the coke, respectively, may be returned to the combustion space together with the flue ash collected. By providing a special bunker through which the flue gases are to pass, it is possible to precipitate the coarse flue ash in the fuel to be used direct.

For collecting the fine flue ash the principal arrangements to be considered are the electric flue ash precipitator and flue ash collecting apparatus with woolen bags; both types will separate substantially all of the flue ash from flue gases passing through them. It should be observed here that the electric flue ash collector may be placed in the main stream of the flue gases, whereas the filter with woolen bags must be arranged in a side stream in order that any interruption in service resulting from a possible obstruction of the filter may be avoided.

It is also possible to effect the separation into coarser and finer flue ash in the electric flue ash collector by regulating the flow of the flue gases through the filter. By allowing a more rapid flow of flue gas through the first sections of the collector, only the coarser flue ash will be precipitated; by appreciably lowering the flow rate in the last sections of the collector, all of the remaining flue ash will be precipitated.

It has proven desirable for all of the flue ash formed in the combustion to be separated and re-cycled at least once with the coarser flue ash. In pulverized coal and oil fired furnaces, this may be effected by regulating the grinding or atomizing, respectively, of the fuel in such a way that a uniform diameter of the flue ash particles is obtained; this diameter being sufficiently great enough that all of the flue ash is collected in the apparatus provided for the coarser flue ash. In practice it has been found that particles having a diameter of 100 to 200 microns are particularly suited for this purpose. Flue ash particles having a diameter in excess of 300 microns are too large to be properly carried along by the flue gas whereas those having a diameter less than 100 microns would probably have a tendency to pass the coarse flue ash collectors.

In order to keep the losses of metals or metallic compounds, respectively, as small as possible, it is advantageous to see that the flue gases do not come in contact with porous refractory material before they reach the flue ash collectors, as such materials have the property of absorbing a large portion of the metallic compounds under operating conditions.

I claim as my invention:

1. In a process for the recovery of vanadium from oils containing the same, the steps of atomizing said oil, effecting combustion of said oil in a furnace continuously producing flue ash particles substantially all not larger than 200 microns in diameter, separating said flue ash particles from the flue gases into a finer portion containing flue ash particles less than approximately 40 microns in diameter and a coarser portion containing flue ash particles greater than approximately 40 microns in diameter, continuously re-cycling said coarser portion to the combustion space and recovering the vanadium from said finer portion.

2. In a process for the recovery of metals from fuels containing the same, the steps of effecting combustion of said fuel, separating the flue ash particles produced into a finer portion and a coarser portion, said finer portion being collected in woolen bag filters, said coarser portion being collected in an oil filter, continuously re-cycling said oil and contained coarse flue ash to the combustion chamber, and recovering the metal values from said finer portion.

3. The process according to claim 2 wherein the coarser flue ash particles have a diameter exceeding approximately 40 microns.

4. In a process for the recovery of metals from fuels containing the same, the steps of effecting combustion of said fuels in a furnace continuously producing flue ash particles substantially all not larger than 200 microns in diameter, separating a coarser portion of said flue ash particles in a plurality of cyclone separators, grinding said coarse portion, continuously re-cycling said ground coarser portion to the combustion chamber, separating a finer portion of said flue ash particles by means of an electric separator and recovering the metal values from said finer portion.

5. The process according to claim 4 wherein the coarser flue ash particles exceed approximately 40 microns in diameter.

HENDRIK JAN JAKOB JANSSEN.